April 25, 1933.　　F. X. LAUTERBUR ET AL　　1,905,114
VARIABLE SPEED MIXING MACHINE
Filed April 14, 1931　　3 Sheets-Sheet 2

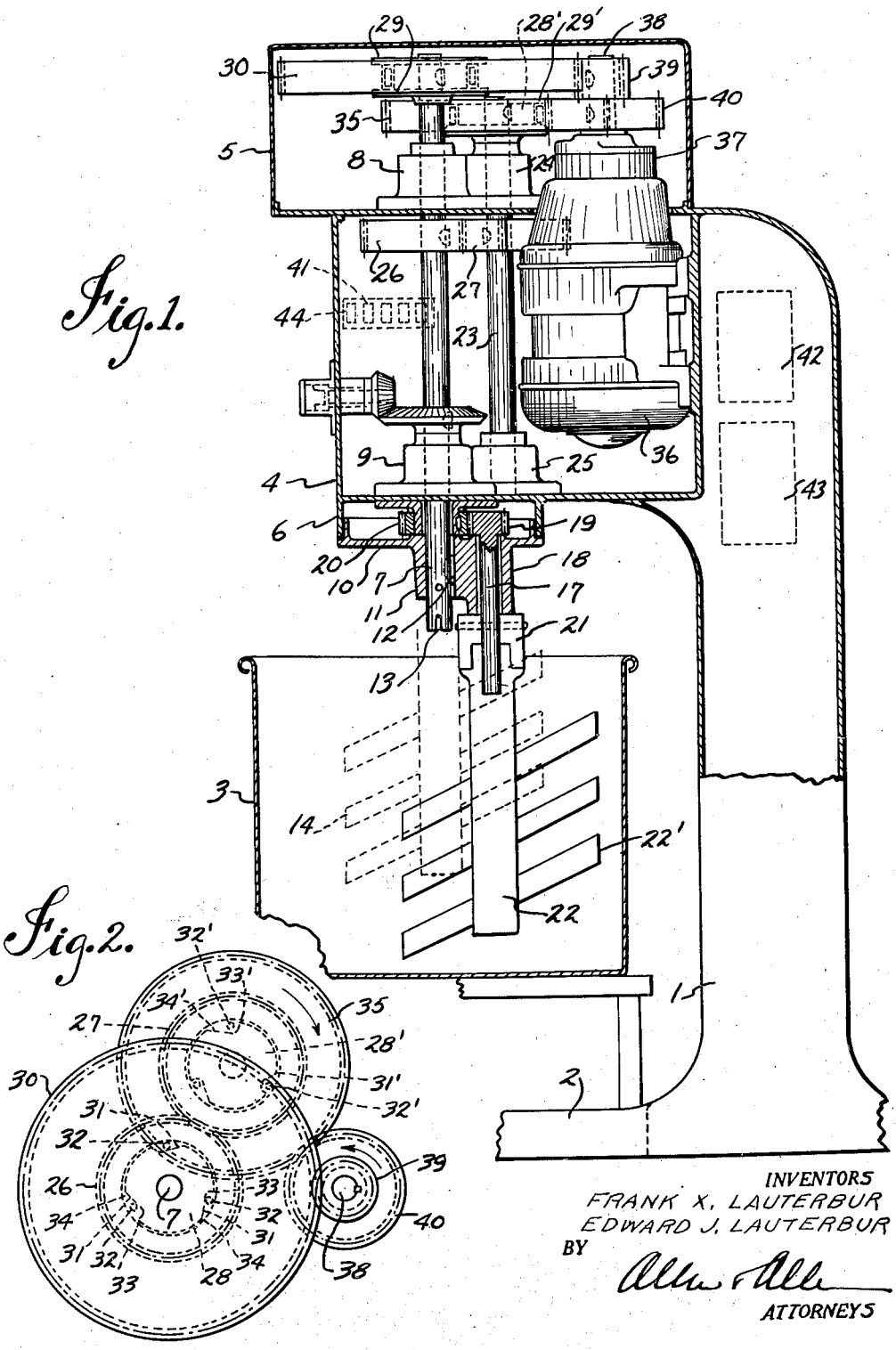

INVENTORS
FRANK X. LAUTERBUR
EDWARD J. LAUTERBUR
BY
ATTORNEYS

April 25, 1933.  F. X. LAUTERBUR ET AL  1,905,114
VARIABLE SPEED MIXING MACHINE
Filed April 14, 1931   3 Sheets-Sheet 3

INVENTORS.
FRANK X. LAUTERBUR
EDWARD J. LAUTERBUR
BY
ATTORNEYS.

Patented Apr. 25, 1933

1,905,114

UNITED STATES PATENT OFFICE

FRANK X. LAUTERBUR AND EDWARD J. LAUTERBUR, OF SIDNEY, OHIO

VARIABLE-SPEED MIXING MACHINE

Application filed April 14, 1931. Serial No. 529,976.

The object of our invention is to afford a number of changes of speed of such machines by comparatively simple and compact mechanism. A further object is to provide for planetary operation of a single agitator or beater, or such operation of a plurality of agitators or beaters with overlapping travel of the blades of the agitators or beaters. A further object is to provide an up and down action of a single agitator or beater or of planetary overlapping agitators or beaters, to afford a very effective wiping or scraping action at the sides and bottom of the mixing vessel, so that the motion is continually cut down and formation of crust on the sides and bottom is avoided.

It will be understood that various changes in the form, proportion, size and minor details of construction, within the scope of the claims, may be resorted to without departing from the spirit or sacrificing any of the advantages of the invention.

In the drawings:

Figure 1 is a vertical section of a mixing machine embodying our invention.

Figure 2 is a plan view further illustrating the arrangement of the gears, their shafts, and their connections to the shafts.

Figure 3:
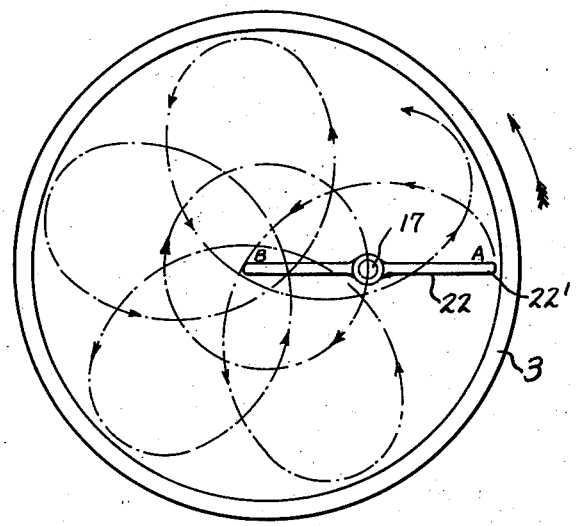
Figure 3 is a diagrammatic plan of the vessel and the planetary beater illustrating in broken lines the travel of the edge of this beater.

The mixing machine comprises a column 1, with a base 2, having at its top a forwardly projecting arm for the support of mechanism for driving one or more agitators or beaters in a vessel 3, supported below this arm in front of the column 1.

The arm is broadened into the form of a casing 4 at the front, on top of which is an upper casing 5. Also there is a smaller bottom casing 6 on the bottom of the arm or middle casing 4. The main shaft 7 is journaled vertically in bearings 8 and 9 in the bottoms of the upper casing 5 and the middle casing 4, respectively, and the bottom 10 of the small lower casing 6 has a downward extension 11 by which it is keyed on the shaft 7 by a key 12. This shaft 7 extends down with a diametrical slot 13 in its lower end, to receive the upper end of the shaft or hub of an agitator or beater 14, represented by dotted lines in Figure 1. In this bottom 10 a spindle 17 is journaled vertically in a bearing radially outward from the main shaft 7; and this spindle has fixed on it above the bearing 18, a spur pinion 19 meshing with a spur gear 20 keyed on the stationary bearing around the main shaft 7 inside this casing 6. Below the bearing 18 this spindle 17 has a chuck 21 to receive the upper end of the hub or shaft of the agitator or beater 22 when the central agitator or beater 14 has been removed from the other shaft 7.

With this arrangement, it will be seen that with the pinion 19 on the spindle 17, which spindle is journaled in the rotatable bottom 10, with the pinion 19 meshing with the inner gear 20 fixed on the bottom of the middle casing 4, this pinion 19 will be caused to roll around the fixed central gear 20, and the result will be that the agitator or beater 22 will be carried in a circle around the center of the vessel 3, while at the same time rotating on its own axis, with the ends of its blades 22' passing close to the walls and bottom of the vessel and preventing formation of crust thereon, as well as, due to the inclination of the blades 22, producing a vertical motion of the material in the vessel. The travel of the ends of the blades 22 is indicated by the broken lines with arrows in Figure 3 where the outer arrow indicates the orbital direction of the planetary gear.

Figure 4:
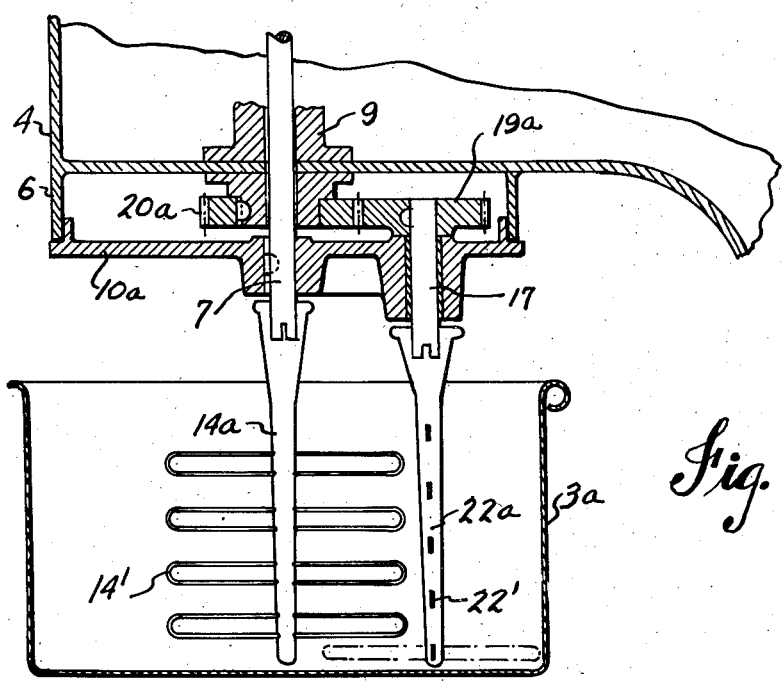
Figure 4 is a diagrammatic vertical cross section showing a modification.

In Figure 4, both agitators 14a and 22a are used at the same time, being placed on two shafts 7 and 17 connected by gearing substantially the same as shown in Figure 1, the central gear 20a being fixed on the bottom of the middle casing 4 inside the bottom casing 6 and meshing with the planetary gear 19a fixed on the shaft 17, while the bottom 10a of the lower casing 6 is keyed on the central shaft 7. The blades 14' and 22' of the respective beaters 14a and 22a not only overlap but those of the one beater pass between the blades of the other beater, providing a very thorough working of the material in the vessel 3a.

Figure 5:
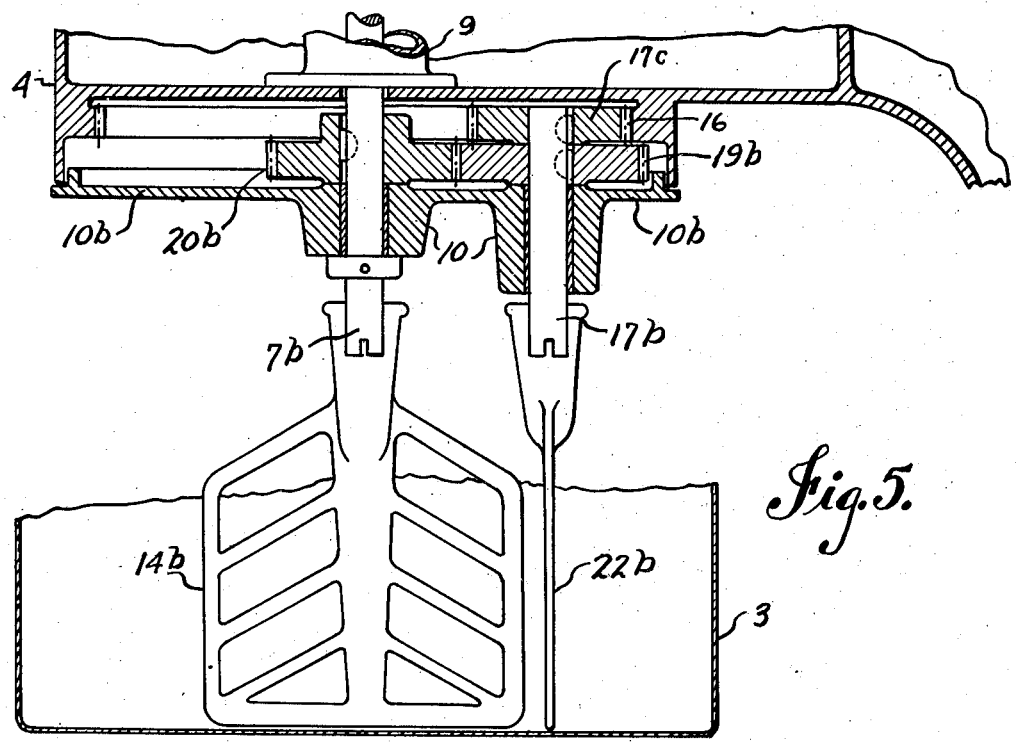
Figure 5 is a view similar to Figure 4, showing a further modification.
Figure 6:
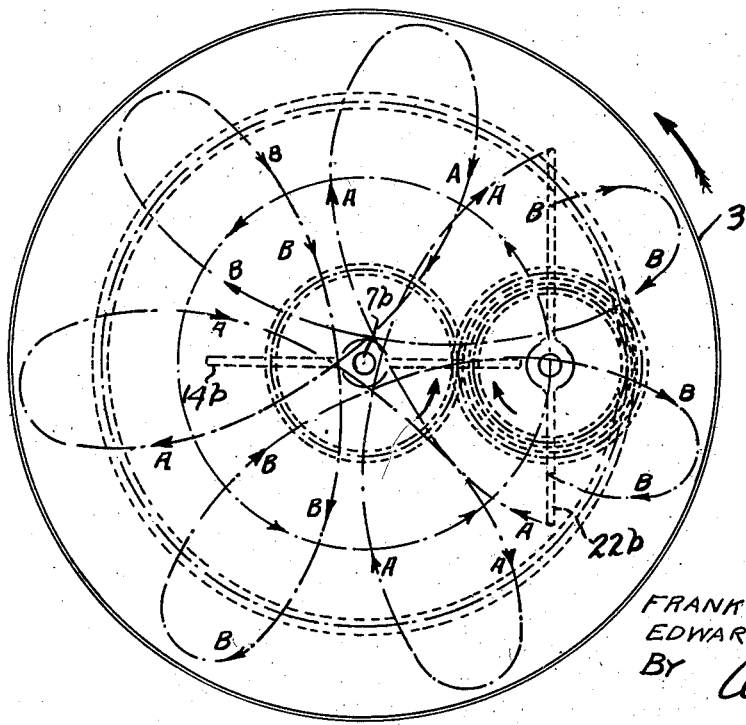
Figure 6 is a plan view of the example of Figure 5, showing the action of the two agitators.

In Figures 5 and 6, the beaters 14b and 22b have vertically continuous outer edge parts, so that although they may have an overlapping relation, the blade of one cannot pass between blades of another. In this example, the central gear 20b is fixed on the central shaft 7b and the planetary pinion 19b, meshing with the central gear 20b, is fixed on the planetary shaft 17b along with the smaller gear 17c which meshes with internal gear teeth 16 on the inner fixed wall of the bottom casing 6b, with the result that the bottom 10b of the casing 6b will be rotated due to the rolling of the gears 10b and 17c and the shaft 17b around the internal gear 16; the ratios of the meshing gears being understood to be such as to maintain the proper relation of the two beaters 14b and 22b so that they never strike together. The path of travel of one edge of the planetary beater 22b is indicated by the broken line with arrows in Figure 6.

The auxiliary shaft 23 is journalled vertically parallel with the main shaft 7 in bearings 24 and 25 in the bottom of the upper casing 5 and the bottom of the middle casing 4 respectively. The main shaft 7 and this auxiliary shaft 23 have keyed on them the spur gears 26 and 27 respectively, in the upper part of the middle casing 4; these gears 26 and 27 meshing together, and, as shown, being of the same diameter, although these gears 26 and 27 are not necessarily of the same diameter as later will be understood.

The main shaft 7 extends above its upper bearing 8 where it has keyed on it the concentric circular clutch member 28, which has axially spaced annular flanges 29 between which is a spur gear 30, the central opening of which has a running fit around the clutch member 28. The periphery of the member 28 has a series of notches 31, Figure 2, each containing a small roller 32. One end 33 of each notch 31 is substantially radial, but the other end 34 is moderately inclined to the peripheral direction; so that relative rotation of the shaft and gear in one direction will cause the roller 32 to be picked up and wedged between the notch end 34 and the interior of the gear opening, thus clutching the shaft and gear together; but upon opposite relative rotation of the gear and shaft, the roller 32 will be released and will become idle near the other end 33 of the notch, thus allowing the free relative rotation of the shaft and gear. Such a friction ratchet clutch, of course, is well known in the art, but it is fully described here to make the operation of the present invention easily understood.

The spur gear 35, below the spur gear 30 just described, is mounted on the upper end part of the auxiliary shaft 23 where this shaft extends above the upper bearing 24, by means of a friction ratchet clutch exactly like the one just described, comprising the clutch member 28' with flanges 29' and with notches 31' containing the rollers 32' and having the ends 33' and 34'; except that the positions of the notches 31' are the reverse of those of the notches 31 in the main shaft clutch member 28. That is to say, that the direction of relative rotation of the auxiliary shaft 23 and its gear 35 which will cause engagement of their clutch is the reverse of the relative rotation of the main shaft 7 and its gear 30 which will engage their clutch.

An electric motor 36 is mounted on the inside of the back of the middle casing 4, on a vertical axis, with its upper end projecting up into the upper casing 5 and having thereon a gear casing 37, which will be understood to contain reducing gearing, the final vertical shaft 38 of which reducing gearing has keyed on it a pinion 39 meshing with the main shaft gear 30 and a larger pinion 40 meshing with the auxiliary shaft gear 35.

By means of suitable switches and wiring, and by having the motor 36 double wound as a two-speed motor, and also having its winding connected so that the motor is reversible, electrical details which are well known to those skilled in the art of electric wiring and motors, a small switch board 41, with five switches, on the outside of the front of the middle casing 4 together with two connection boxes 42 and 43 on the side of the column 1 in back of the middle casing 4, serve to vary the operation of the motor 6 in the respects just mentioned; four of the switches on the board 41 being for running the motor 36 in either direction, two speeds for each direction, and a fifth switch 44 being for stopping the motor.

If the motor turns in one direction, its small pinion 39 will turn the main shaft gear 30 in clutching direction, while its larger pinion 40 will turn the auxiliary shaft gear 35 in releasing direction. Thus the main shaft 7 will be driven directly from the motor 36; the gear 35 idling on the stationary auxiliary shaft 23. If the motor 36 turns in the opposite direction, its larger pinion 40 will turn the auxiliary shaft gear 35 in clutching direction, turning the auxiliary shaft 23 in that direction, and this shaft 23 will, by means of the gears 27 and 26, turn the main shaft 7 in the opposite direction; which direction however, will be the same as that in which it was turned with the first described direction of rotation of the motor 36. However, the gear 30 of this main shaft 7 is now being turned by the smaller motor pinion 39 also in the same direction that it turned before the motor was reversed; so that the relative rotation of the main shaft 7 and its gear 30 is in such direction that the gear 30 is released from the clutch member 28 and the main shaft 7, and runs idly.

Since the ratio between large motor pinion 40 and auxiliary shaft gear 35 is lower than that between smaller motor pinion 39 and main shaft gear 30, the speed of the main shaft 7 is changed without changing the direction of rotation of the shaft, merely by reversing the rotation of the motor 36. These two speeds of the main shaft 7 are multiplied to four speeds by means of the two-speed operation of the motor in either direction; and by shifting the agitator 22 either to the main shaft 7 or the spindle 17, these four speeds of the main shaft 7 are multiplied to eight speeds.

It may be pointed out that if the gears 26 and 27, by which the auxiliary shaft 23 drives the main shaft 7 with one direction of motor rotation, are of an uneven ratio instead of being of equal diameter as here shown, such ratio will enter along with that between the larger pinion 40 and auxiliary shaft gear 35 as a factor in the ultimate ratio between the speed of the motor 36 and that of the main shaft 7. Because of this the pinions 39 and 40 of the motor would not then necessarily be of different diameters, if the ratio between the two shafts 23 and 7 is different from that between the motor and the auxiliary shaft 23. Also it will be understood that drive members other than shafts, or transmission elements other than spur gears and pinions, or automatic engaging and releasing means other than the friction clutches, or motive means other than an electric motor may enter into the construction of a machine embodying our invention; and that such a change-speed mechanism is applicable to machines other than the mixer used for illustration.

Having thus described our invention, what we claim as new and desire to secure by Letters Patent, is:

1. In a device of the character described, three parallel shafts, gear means fixed on one shaft, gears fixed on respective ones of the other two shafts, meshing together, gears rotatable on respective ones of these other two shafts, meshing with the gear means on the first shaft and constrained thereby both to rotate in the same direction, and means clutching the last mentioned gears to their respective shafts, one upon relative rotation of the shaft and gear in one direction only and the other upon relative rotation of the shaft and gear in the opposite direction only.

2. In a device of the character described, a motor having a shaft on a vertical axis, gear means fixed on said motor shaft, two additional shafts parallel with said motor shaft alongside said motor, gears fixed on respective ones of these other two shafts, meshing together, gears rotatable on respective ones of these other two shafts, meshing with the gear means on the motor shaft and constrained thereby both to rotate in the same direction, and means clutching the last mentioned gears to their respective shafts, one upon rotation of the gear in one direction only and the other upon rotation of the gear in the other direction only.

3. In a device of the character described, a motor having a shaft extending upwardly therefrom on a vertical axis, gear means fixed on the upper end part of said motor shaft, two additional shafts parallel with said motor shaft alongside said motor, both extending above said motor and at least one extending below said motor, gears fixed on respective ones of these other two shafts alongside said motor, said gears meshing together, gears rotatable on the upper end parts of respective ones of these other two shafts, meshing with the gear means on the motor shaft and constrained thereby both to rotate in the same direction, means clutching the last mentioned gears to their respective shafts, one upon rotation of the gear in one direction only and the other upon rotation of the gear in the other direction only, and work-performing means operatively connected to the lower end part of the shaft that extends below the motor.

FRANK X. LAUTERBUR.
EDWARD J. LAUTERBUR.